United States Patent [19]
Gresham

[11] Patent Number: 5,649,148
[45] Date of Patent: Jul. 15, 1997

[54] FAST DIGITAL SIGNAL PROCESSOR INTERFACE USING DATA INTERCHANGING BETWEEN TWO MEMORY BANKS

[75] Inventor: Paul A. Gresham, Arnprior, Canada

[73] Assignee: Mitel Corporation, Kanata, Canada

[21] Appl. No.: 65,533

[22] Filed: May 21, 1993

[30] Foreign Application Priority Data

Oct. 8, 1992 [CA] Canada .................. 2080159

[51] Int. Cl.[6] .................. G06F 12/00; H04Q 11/04
[52] U.S. Cl. .................. 395/427; 364/DIG. 1; 364/DIG. 2; 364/238; 365/189.02; 395/494; 395/405; 370/378
[58] Field of Search .................. 364/200, DIG. 1, 364/DIG. 2; 395/400, 475, 484, 401, 405, 454, 427, 494, 407; 365/189.02; 370/53, 66

[56] References Cited

U.S. PATENT DOCUMENTS

| | | | |
|---|---|---|---|
| 4,259,719 | 3/1981 | Edelman et al. | 395/425 |
| 4,591,827 | 5/1986 | Nishita et al. | 340/347 |
| 4,809,161 | 2/1989 | Torii et al. | 395/425 |
| 4,893,279 | 1/1990 | Rahman et al. | 365/230.03 |
| 5,146,581 | 9/1992 | Kaneko | 395/425 |
| 5,341,489 | 8/1994 | Heiberger et al. | 395/425 |
| 5,353,374 | 10/1994 | Wilson et al. | 395/235 |
| 5,371,877 | 12/1994 | Drako et al. | 395/425 |
| 5,394,536 | 2/1995 | Coghlan et al. | 395/425 |

FOREIGN PATENT DOCUMENTS 0560020  9/1993  European Pat. Off. .

*Primary Examiner*—Tod R. Swann
*Assistant Examiner*—Tuan V. Thai
*Attorney, Agent, or Firm*—Laff, Whitesel, Conte & Saret, Ltd.

[57] ABSTRACT

A digital signal processor (DSP) interface comprised of a memory containing a pair of memory banks, apparatus for storing an input signal in a first one of the memory banks, apparatus for storing a signal from the DSP in a second one of the memory banks, apparatus for switching the content of the two memory banks, apparatus for reading either or both of the two memory banks to a first and a second memory output respectively, whereby the input signal modified or replaced by the signal from the DSP is output from the memory.

3 Claims, 1 Drawing Sheet

FAST DIGITAL SIGNAL PROCESSOR INTERFACE USING DATA INTERCHANGING BETWEEN TWO MEMORY BANKS

FIELD OF THE INVENTION

This invention relates to control systems for program controlled telephone switching systems and in particular to a high bandwidth interface between a serial bus and a digital signal processor (DSP), and includes a system to optionally perform Pulse Code Modulation PCM expanding and linear companding using the A-law or µ-law conversion standard.

BACKGROUND TO THE INVENTION

A DSP is typically enabled by a telephone switching system central controller to manipulate digitized audio tones. DSPs are typically program controlled and its functions include PCM expanding or linear companding to or from CCITT A-law and or µ-law standards. The DSP typically also performs other functions, such as conferencing, tone detection, voice mail, etc. The output of data of the DSP typically is applied either to a sixteen channel parallel bus or to a serial bus.

In previous implementations, in-bound serial data to a DSP is shifted into a shift register every alternate channel time. After the shifting is complete, the DSP is interrupted to copy the in-bound data out of the register, and to copy any out-bound data into that register. The DSP uses a full channel time to complete this function. On the next channel boundary, shifting is resumed to shift out the out-bound data and simultaneously to shift in the next in-bound data.

The result of this is that out of thirty-two channels available on a typical serial bus such as the ST-BUS utilized in products sold by Mitel Corporation, only a maximum of sixteen channels could be used. Further, at least one of those sixteen channels were required to be used for control messaging.

In addition, access to this data has been processor intensive, involving sixteen interrupts every 125 microsecond frame; the timing of these channel interrupts has been found to be not straight forward. The result is a large software and time overhead required for data handling.

For example, out-bound data is two channels later than in-bound data. Also frame synchronization is required to be accomplished in software, since the DSP has no other way of determining what channel time the data it has read is coming from.

Conversion of PCM data to linear 16 bit integers using the A-law or µ-law standards was required to be done by means of DSP software. That software is an intensive algorithm and can result in undesirable compromises.

SUMMARY OF THE INVENTION

The present invention gives a DSP parallel access to all 32 bytes of the serial ST-BUS at once. The data is provided in 125 microseconds snap-shots. The 32 bytes presented represent all of the channel data that was received during the previous frame. The DSP is free to read and modify this data. Any modified data appears on the ST-BUS output link during the following frame time. The data is presented to the DSP in a logically consistent manner. Parallel access to this data is provided in two ways, either directly, or through A-law or µ-law companding and expanding filters. It allows expansion or companding of the PCM data during read and write cycles respectively, with no DSP overhead. The result is much more efficient operation of a DSP than in the aforenoted previous system.

In accordance with the present invention, a digital signal processor (DSP) interface is comprised of a memory containing a pair of memory banks, apparatus for storing an input signal in a first one of the memory banks, apparatus for storing a signal from the DSP in a second one of the memory banks, apparatus for logically switching the contents of the two memory banks, apparatus for reading the first one of the memory banks and converting the data to an output signal, and apparatus for reading the second one of the memory banks to provide a signal for the DSP, whereby the input signal modified or replaced by the signal from the DSP is output from the memory.

BRIEF INTRODUCTION TO THE DRAWINGS

A better understanding of the invention will be obtained by reference to the detailed description below, in conjunction with the following drawings, in which:

FIG. 1 is a block diagram of the invention.

DETAILED DESCRIPTION OF THE INVENTION

Figure 1:
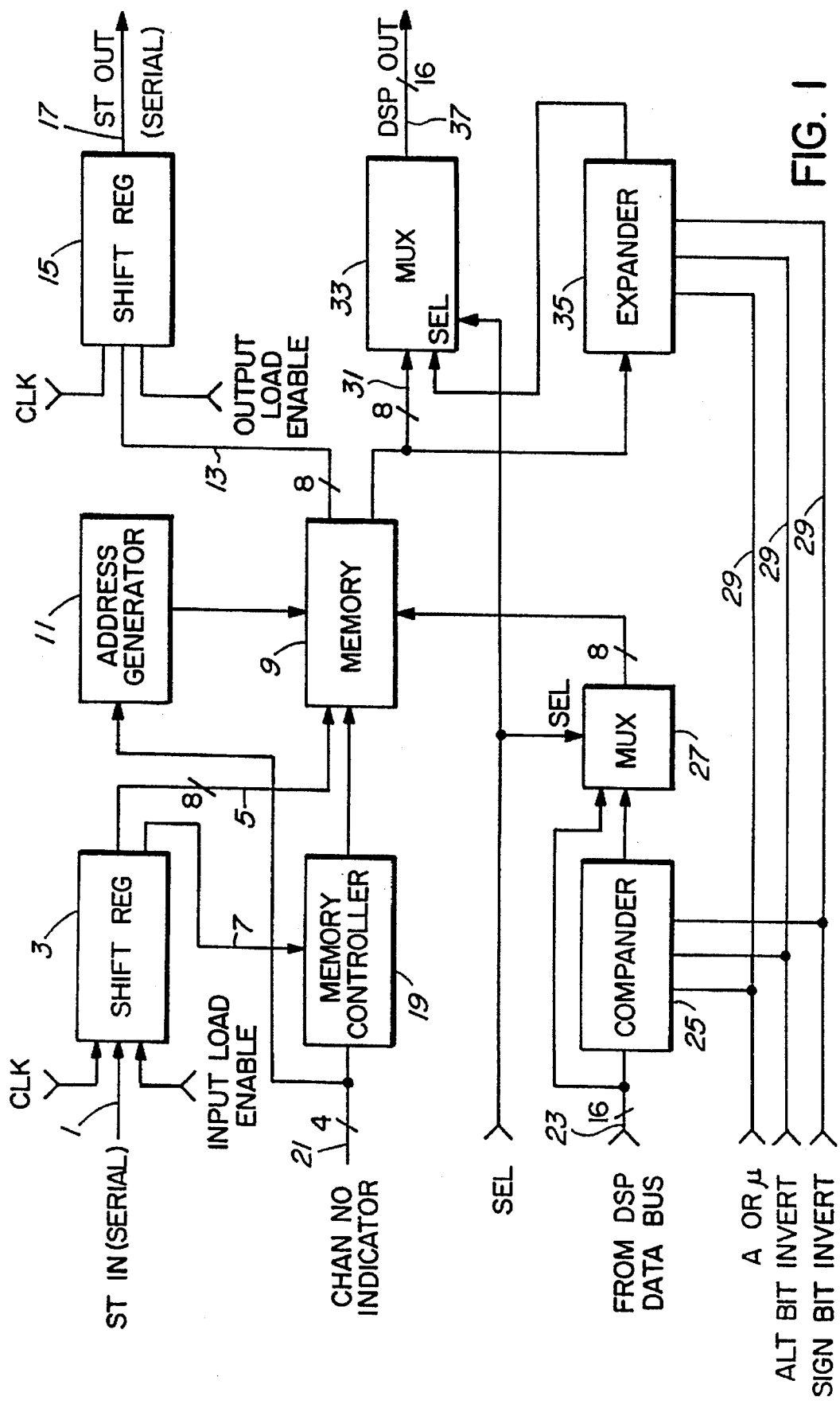

Serial data from e.g. an ST-BUS on input line 1 is applied to an 8 bit input shift register 3. The shift register also receives an input shift clock signal on the input line CLK and an input load enable signal on another line from an external circuit, not shown, which generates signals on the clock and input load enable line from a clock and frame pulse source in synchronization circuitry of a switching system which utilizes the present invention.

Data appears on output bus 5 of shift register 3 on the channel boundary, and is maintained (e.g. by an internal latch on that bus) for one full channel time. A flag also appears on line 7 of shift register 3 which indicates a new channel time. Output bus 5 is connected to an input of memory 9. This memory is preferably an SRAM, which contains storage capacity in two banks of 32 bytes each.

An 8-bit output bus 13 from memory 9 applies bytes of data to the input of output shift register 15 which, like shift register 3, is an 8 bit shift register. The output of shift register 15 is an ST-BUS serial output line 17. Also input to shift register 15 are an output load enable line and an output shift clock line, connected to similar circuitry as the corresponding enable and clock input of shift register 3.

A memory controller 19 has its input connected to line 21 which carries a signal from the ST-BUS signal source indicating the channel number of the data passing from the input line 1 into shift register 3. Also input into memory controller 19 is the new channel time flag signal on line 7 from shift register 3. The output of memory controller 19 is connected to memory bank control input of memory 9. Address generator 11 is also connected with its input to the line 21 and its output to the address input of memory 9.

As noted above, serial data appears on line 1 and is shifted into shift register 3. The data appears on its output line 5 for a full channel time, and appears at the data input of memory 9.

The output of the memory controller 19 controls which 32 byte bank in memory 9 the output data of shift register 3 is to be written to. The memory controller 19, at the time of the channel boundary enabled by the flag on line 7, allows data from the output of the input shift register to be written to a first bank in the memory 9. It then controls reading of the memory 9 for the next outputting data, as will be described below, to be loaded into the output shift register 15 via the bus 13.

The address generator 11 causes the data output from input shift register 3 to be written into memory 9 at an address corresponding to the channel time of the input data. Memory 9 is read and data copied from the address corresponding to the next output channel time. In this manner, data is shifted into and out of memory 9 during the frame time.

However, the DSP can control the content of the data which is output to the output shift register 15, as will be described below.

While data has been described above as having been shifted into and out of one of the memory banks during the frame time, at the same time the DSP has exclusive access to the other bank of 32 bytes. As noted earlier, on the frame boundary, the content of the memory banks are logically switched. In this manner, all of the previous frame of information that was shifted into one memory bank becomes available to the DSP. Likewise, any data that was stored or changed by the DSP during the previous frame and stored in the second memory bank, is switched into the first memory bank, and is shifted out during the current frame.

Logically switching the contents of both banks in memory 9 is done as follows. Each of the RAM banks has multiplexers on its inputs and outputs. Each multiplexer has signals from the DSP and signals from the ST-BUS memory controller. There is one common control signal for all these multiplexers in memory 9. In this manner, the contents of the RAM banks can be logically switched not by copying the data, but by switching the address, control, and data signals of each of the RAM banks.

Bus 23, connected to the DSP data bus is connected to the data input of compander 25 and to an input of multiplexer 27. The output of compander 25 is also connected to an input of multiplexer 27. Thus multiplexer 27 can select DSP data from data bus 23 or data having been companded during passage during compander 25.

Inputs to compander 25 are also three control lines 29 which receive data from a control register preset by the main switching system control unit, to cause the compander 25 to convert the input data into A or μ-law form, to do alternate bit inversion, or to invert the sign bit of the data. Compander 25 is a well known element, containing logic to compand a 16 bit linear integer to an 8 bit PCM byte.

When the DSP does a write to memory 9, multiplexer 27, under control of an address bit from the DSP on line 28, selects and applies either the raw DSP data or companded DSP data to input B of memory 9. That data is written in the second memory bank of memory 9.

Memory 9 also has a DSP output bus 31 which is connected to one input of multiplexer 33. Bus 31 is also connected to the input of expander 35, the output of which is connected to another input of multiplexer 33. The select lead 28 input to multiplexer 27 is also connected to the select input of multiplexer 33. The output of multiplexer 33 is the DSP output bus 37. Thus the output bus 37 selectively carries in respective frames either the DSP output signal from bus 31, or the same signal which has been expanded. Expander 35 also receives the same control signals from control lines 29. Expander 35 contains logic to expand a PCM byte into a 16 bit sign extended integer in a well known manner.

Any reads by the DSP from one of the memory banks contains data that was received during the previous frame time of channels 0 to 31 respectively. The data is constant and unchanging until the frame boundary, unless the DSP alters it.

Thus to the serial ST-BUS an 8 bit frame memory appears to be utilized. To the DSP, it appears that a 32 byte read/write memory is utilized.

All serial data received on the serial line is transferred to memory 9 in parallel format on line (bus) 5. The DSP can read and modify the data via bus 23 and bus 37, companded or not. Then the data is transferred back to shift register 15 and into serial format, and is transmitted out the serial output line 17.

It should be noted that it is possible for the DSP to write linear values into the memory, and to read back the corresponding companded PCM values at a different address. It is also possible for the DSP to write companded values into the memory and then to read back corresponding linear values from it. Both these operations require that the DSP do the read during the same frame as the write.

A person understanding this invention may now conceive of alternative structures and embodiments or variations of the above. All of those which fall within the scope of the claims appended hereto are considered to be part of the present invention.

I claim:

1. A digital signal processor (DSP) interface comprising:
   (a) a memory containing a pair of memory banks
   (b) means connected to the memory for receiving an input signal and for storing the input signal in a first one of said pair of memory banks,
   (c) means connects to the memory for receiving a signal from a digital signal processor (DSP) and for storing the signal from the DSP in a second one of said pair of memory banks,
   (d) means connects to the memory for logically interchanging contents of said pair of memory banks,
   (e) means connected to the memory for reading said first one of said pair of memory banks and converting data read from the first one of said pair of memory banks to an output signal,
   (f) means for reading the second one of said pair of memory banks and providing a signal for input to the DSP,
   (g) the storing means further comprises an input shift register for receiving a serial input signal having plurality of channels, the input shift register containing sufficient storage for one of the channels and providing a parallel input signal to the memory, each of the channel banks having sufficient capacity to store one of each of the channels of a frame at a memory location corresponding to a channel time thereof,
   (h) means for selectively expanding the output signal of one of the memory banks after reading the memory,
   (i) an output shifter register having similar capacity as said input shifter register, and having means for receiving an output from one of the memory banks on a channel by channel basis and for outputting a serial signal on a serial output bus,
   (j) means for receiving an output signal of the other of said pair of memory banks and for providing a DSP signal on a DSP parallel output bus.

2. A DSP interface as defined in claim 1 including means for selectively companding said signal from the DSP prior to storage in the second one of the memory banks.

3. A DSP interface as defined in claim 2 including means for selectively expanding an output signal of one of said memory banks after reading the memory.

* * * * *